(12) United States Patent
Yang et al.

(10) Patent No.: US 9,848,350 B2
(45) Date of Patent: Dec. 19, 2017

(54) METHOD AND DEVICE FOR OBTAINING AND REPORTING MEASUREMENT RESULT OF UPLINK COVERAGE MEASUREMENT ITEMS

(71) Applicant: Huawei Technologies Co., Ltd., Shenzhen (CN)

(72) Inventors: Xiaodong Yang, Shenzhen (CN); Haitao Xia, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 403 days.

(21) Appl. No.: 14/490,315

(22) Filed: Sep. 18, 2014

(65) Prior Publication Data
US 2015/0003278 A1 Jan. 1, 2015

Related U.S. Application Data

(63) Continuation of application No. PCT/CN2012/072561, filed on Mar. 19, 2012.

(51) Int. Cl.
*H04W 24/10* (2009.01)
*H04W 24/02* (2009.01)
*H04W 72/04* (2009.01)

(52) U.S. Cl.
CPC ........... *H04W 24/10* (2013.01); *H04W 24/02* (2013.01); *H04W 72/0413* (2013.01)

(58) Field of Classification Search
CPC .. H04W 24/10; H04W 72/0413; H04W 24/02
See application file for complete search history.

(56) References Cited

U.S. PATENT DOCUMENTS

2005/0249164 A1* 11/2005 Kwak ............... H04W 72/1289
370/335
2011/0199923 A1 8/2011 Persson et al.
(Continued)

FOREIGN PATENT DOCUMENTS

CN 101931981 A 12/2010
CN 102045644 A 5/2011
(Continued)

OTHER PUBLICATIONS

Huawei, "Analysis of MDT UL Coverage Use Case" 3GPP TSG WG1 meeting #67, San Francisco, USA, Nov. 14-18, 2011, 3 pages.
(Continued)

*Primary Examiner* — Hassan Kizou
*Assistant Examiner* — Abdullahi Ahmed
(74) *Attorney, Agent, or Firm* — Brinks Gilson & Lione

(57) ABSTRACT

A method and device for obtaining and reporting a measurement result of measurement item related to uplink coverage. The method comprises: obtaining a minimized drive test MDT parameter; calculating the measurement result of the measurement item related to the uplink coverage based on the MDT parameter, and sending the measurement result, wherein the measurement item comprises at least one of an uplink pathloss, a power of a Physical Uplink Shared Channel PUSCH for each resource block and a power of a Physical Uplink Control Channel PUCCH; or saving the MDT parameter in an MDT measurement report and sending the MDT measurement report to a trace collection entity TCE, by eNB, wherein the TCE obtains the MDT parameter from the obtained MDT measurement report and calculates the measurement result based on the MDT parameter.

11 Claims, 7 Drawing Sheets

(56) References Cited

U.S. PATENT DOCUMENTS

| | | | | |
|---|---|---|---|---|
| 2012/0087259 | A1* | 4/2012 | Kim | H04W 24/10 370/252 |
| 2012/0088457 | A1 | 4/2012 | Johansson et al. | |
| 2012/0106386 | A1* | 5/2012 | Johansson | H04W 24/10 370/252 |
| 2013/0053017 | A1* | 2/2013 | Chang | H04W 24/10 455/422.1 |
| 2013/0188502 | A1* | 7/2013 | Yang | H04W 28/16 370/252 |
| 2015/0045014 | A1* | 2/2015 | Bodog | H04W 24/10 455/422.1 |

FOREIGN PATENT DOCUMENTS

| | | |
|---|---|---|
| CN | 102137415 A | 7/2011 |
| CN | 102378237 A | 3/2012 |
| EP | 2437540 A1 | 4/2012 |
| WO | WO 2011/162668 A1 | 12/2011 |
| WO | WO 2013/067934 A1 | 5/2013 |
| WO | WO 2013/135310 A1 | 9/2013 |

OTHER PUBLICATIONS

Huawei, "Draft LS Response of MDT UL coverage use case" Agenda Item 5, 3GPP TSG RAN WG1 meeting #68, Dresden, Germany, Feb. 6-10, 2012, 4 pages.

Huawei, HiSilicon, "Uplink Coverage for MDT" Agenda Item 5.2.4, 3GPP TSG-RAN WG2 Meeting #77 BIS, Jeju, Korea, Mar. 26-30, 2012, 7 pages.

Xiao, TSG RAN WG1, "LS response of MDT UL Coverage Use Case" Release REl-11, 3GPP TSG RAN WG1 Meeting #68, Dresden, Germany, Feb. 6-10, 2012, 1 page.

Lte, "3$^{rd}$ Generation Partnership Project; Technical Specification Group Radio Access Network; Evolved Universal Terrestrial Radio Access (E-UTRA); Physical layer; Measurements" (Release 10) 3GPP TS 36.214, V10.1.0, Mar. 2011, 13 pages.

Lte, "3$^{rd}$ Generation Partnership Project; Technical Specification Group Radio Access Network; Universal Terrestrial Radio Access (UTRA) and Evolved Universal Terrestrial Radio Access (U-TRA); Radio measurement collection for Minimization of Drive Tests (MDT); Overall description; Stage 2" (Release 10) 3GPP TS 37.320, V10.4.0, Dec. 2011, 18 pages.

Lte, "3$^{rd}$ Generation Partnership Project; Technical Specification Group Radio Access Network; Evolved Universal Terrestrial Radio Access (E-UTRA); Physical layer procedures" (Release 10) 3GPP TS 36.213, V10.5.0, Mar. 2012, 125 pages.

Lte, "3$^{rd}$ Generation Partnership Project; Technical Specification Group Radio Access Network; Evolved Universal Terrestrial Radio Access (E-UTRA); Requirements for support of radio resource management" (Release 11) 3GPP TS 36.133. V11.0.0, Mar. 2012, 569 pages.

Lte, "3$^{rd}$ Generation Partnership Project; Technical Specification Group Services and System Aspects; Telecommunication management; Subscriber and equipment trace; Trace control and configuration management" (Release 11) 3GPP TS 32.422, V11.3.0, Mar. 2012, 121 pages.

* cited by examiner

METHOD AND DEVICE FOR OBTAINING AND REPORTING MEASUREMENT RESULT OF UPLINK COVERAGE MEASUREMENT ITEMS

CROSS-REFERENCE TO RELATED APPLICATIONS

This application is a continuation of International Application No. PCT/CN2012/072561, filed on Mar. 19, 2012, which is hereby incorporated by reference in its entirety.

FIELD OF TECHNOLOGY

The disclosure relates to the field of mobile communication technologies, and in particular, to a method for obtaining and reporting a measurement result of a measurement item related to an uplink coverage and a device thereof

BACKGROUND OF THE INVENTION

Unbalance of uplink coverage and downlink coverage, as a common problem in a mobile communication network, is usually incurred by the limited uplink coverage. In case of limited uplink coverage, user equipment (UE) can not communicate with the network even with a highest transmitting power, for the reason of a large uplink pathloss or a large uplink interference. Execution of UE services may be influenced by a poor uplink coverage, for example, UE call establishment may fail for increasing times, UE calls may drop for increasing times, and the quality of uplink voice is decreased.

Conventionally, a measurement item related to the uplink coverage is mainly collected by the communication network with a minimized drive test (MDT) function defined in the 3rd Generation Partnership Project (3GPP) protocol. A measurement item M2, i.e., a power headroom (PH), is configured in an MDT task. PH may function as the measurement item related to the uplink coverage of the UE, and the intensity of the uplink coverage of the UE is determined based on the PH value.

Conventionally, UE sends the PH value to an evolved Node B (eNB) through Media Access Control (MAC) protocol. An element manager (EB), or a mobility management entity (MME) in a core network node has created an immediate minimized drive test (Immediate MDT) task to instruct the eNB to collect the PH value. The eNB saves the received PH value in an MDT measurement report and sends the MDT measurement report to a trace collection entity (TCE), so that the TCE may determine the intensity of the uplink coverage of the UE based on the PH value in the MDT measurement report.

However, the problem in uplink coverage can not be truly reflected by the PH reported by the UE, and the uplink pathloss and uplink interference of the UE may be wrongly determined with a coverage optimization application in the TCE layer.

SUMMARY OF THE INVENTION

A method for obtaining and reporting a measurement result of a measurement item related to an uplink coverage and a device thereof are provided according to embodiments of the disclosure, to obtain and report the measurement result of the measurement item related to the uplink coverage, which may truly reflect the problem in the uplink coverage. Accordingly, an uplink pathloss or an uplink interference of UE may be precisely determined by a coverage optimization application in a TCE layer.

A method according to an embodiment of the disclosure includes:

obtaining an MDT parameter;

calculating the measurement result of the measurement item related to the uplink coverage based on the MDT parameter, and sending the measurement result of the measurement item related to the uplink coverage; where the measurement item related to the uplink coverage includes at least one of an uplink pathloss, a power of a Physical Uplink Shared Channel PUSCH for each resource block and a power of a Physical Uplink Control Channel PUCCH; or saving the MDT parameter in an MDT measurement report and sending the MDT measurement report to a trace collection entity TCE, by an eNB, where the TCE obtains the MDT parameter from the obtained MDT measurement report, and calculates the measurement result of the measurement item related to the uplink coverage based on the MDT parameter; where the measurement item related to the uplink coverage includes at least one of an uplink pathloss, a power of a PUSCH for each resource block and a power of a PUCCH.

A device according to an embodiment of the disclosure includes:

a processor, for obtaining an MDT parameter; calculating the measurement result of the measurement item related to the uplink coverage based on the MDT parameter; or saving the MDT parameter in an MDT measurement report and sending the MDT measurement report to a TCE, where the TCE obtains the MDT parameter from the received MDT measurement report and calculates the measurement result of the measurement item related to the uplink coverage based on the MDT parameter, where the measurement item related to the uplink coverage includes at least one of an uplink pathloss, a power of a PUSCH for each resource block and a power of a PUCCH; and a sender, for sending the measurement result of the measurement item related to the uplink coverage after the measurement result of the measurement item related to the uplink coverage is calculated by the processor, or sending the MDT measurement report after the MDT parameter is obtained and saved to the MDT measurement report by the processor.

With the forgoing technical solution, the disclosure has the following advantages:

the MDT parameter is obtained, the measurement result of the measurement item related to the uplink coverage is calculated based on the MDT parameter. Alternatively, the eNB saves the MDT parameter in the MDT measurement report and sends the MDT measurement report to the TCE, so that the TCE calculates the measurement result of the measurement item related to the uplink coverage based on the MDT parameter in the MDT measurement report. The measurement item related to the uplink coverage includes at least one of the uplink pathloss, the power of the PUSCH for each resource block and the power of the Physical Uplink Control Channel, and accordingly, the uplink pathloss or an uplink interference of the UE may be precisely determined by the coverage optimization application in the TCE layer, to precisely identify the problem in the uplink coverage of the UE.

DETAILED DESCRIPTION OF EMBODIMENTS

Figure 1:
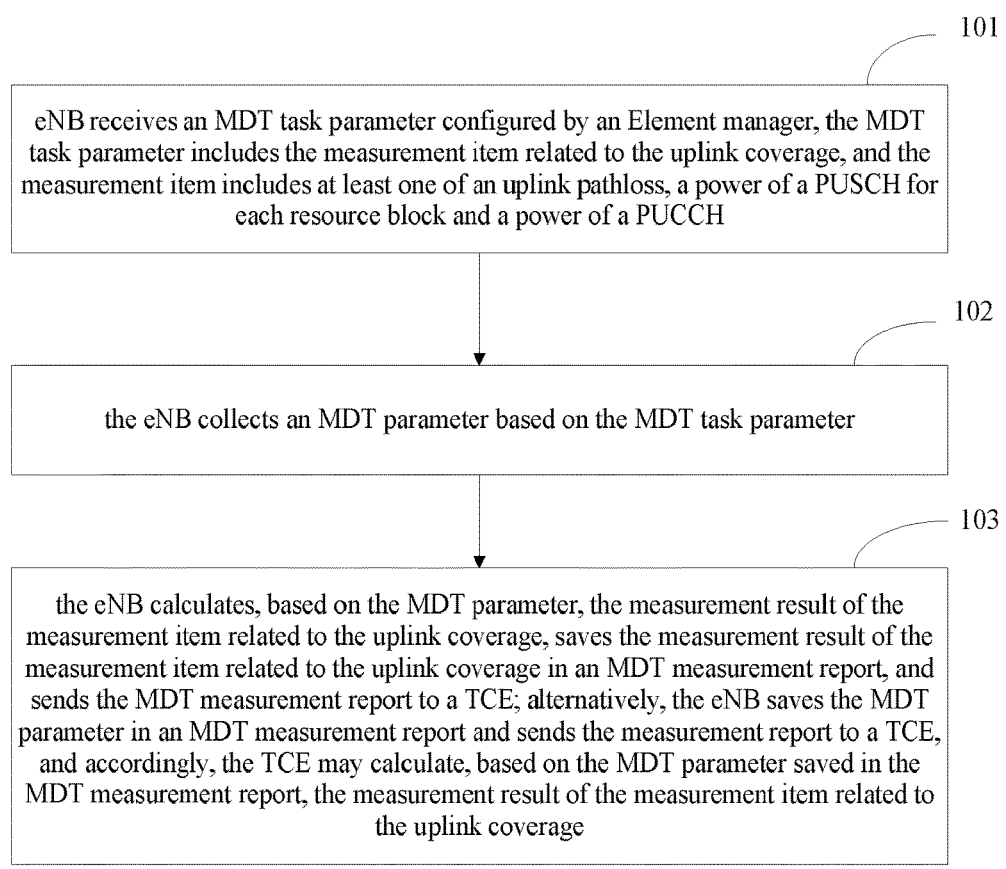
FIG. 1 is a flow chart of a method for obtaining and reporting a measurement result of a measurement item related to an uplink coverage according to an embodiment of the disclosure.

A method for obtaining and reporting a measurement result of a measurement item related to an uplink coverage and a device thereof are provided according to embodiments of the disclosure, to obtain and report the measurement result of the measurement item related to the uplink coverage, which may truly reflect the problem in the uplink coverage. Accordingly, an uplink pathloss or an uplink interference of UE may be precisely determined with a coverage optimization application in a TCE layer, to precisely identify the problem in the uplink coverage of the UE.

The method for obtaining and reporting the measurement result of the measurement item related to the uplink coverage according to the embodiments of the disclosure includes: obtaining an MDT parameter; calculating the measurement result of the measurement item related to the uplink coverage based on the MDT parameter; and sending the measurement result of the measurement item related to the uplink coverage. The measurement item related to the uplink coverage includes at least one of the uplink pathloss, a power of a Physical Uplink Shared Channel PUSCH for each resource block and a power of a Physical Uplink Control Channel PUCCH. It should be noted that the method may be executed by an eNB or by the UE in the processes detailed hereinafter according to the embodiments of the disclosure, which is omitted here.

Alternatively, the method for obtaining and reporting the measurement result of the measurement item related to the uplink coverage may include: obtaining an MDT parameter, saving the MDT parameter in an MDT measurement report and sending the MDT measurement report to a trace collection entity TCE, by an eNB. Accordingly, the TCE obtains the MDT parameter from the received MDT measurement report and calculates, based on the MDT parameter, the measurement result of the measurement item related to the uplink coverage. The measurement item related to the uplink coverage includes at least one of the uplink pathloss, a power of a Physical Uplink Shared Channel PUSCH for each resource block and a power of a Physical Uplink Control Channel PUCCH.

It should be noted that, according to the embodiments of the disclosure, the measurement item related to the uplink coverage may include a power headroom.

It should be noted that, according to the embodiments of the disclosure, the measurement item related to the uplink coverage is included in MDT task parameter(s) configured by an element manager. Alternatively, in the case that the measurement item related to the uplink coverage includes a first measurement item and a second measurement item and the first measurement item includes the power headroom, the power headroom is included in the MDT task parameter(s) configured by the element manager, the second measurement item includes at least one of the uplink pathloss, the power of the Physical Uplink Shared Channel PUSCH for each resource block and the power of the Physical Uplink Control Channel PUCCH, and the second measurement item is pre-configured by eNB.

For better understanding of the technical solutions of the disclosure, description of various cases is detailed in the following.

Referring to FIG. 1, a method for obtaining and reporting a measurement result of a measurement item related to an uplink coverage according to an embodiment of the disclosure includes steps 101 to 103.

In the step 101, eNB receives an MDT task parameter configured by an element manager. The MDT task parameter includes the measurement item related to the uplink coverage. The measurement item includes at least one of an uplink pathloss, a power of a PUSCH for each resource block and a power of a PUCCH.

According to the embodiment of the disclosure, the element manager may configure, through a network management interface, the MDT task parameter for the eNB when creating an immediate MDT task. The MDT task parameter includes the measurement item related to the uplink coverage, and the measurement item includes at least one of the uplink pathloss, the power of the PUSCH for each resource block and the power of the PUCCH.

According to the embodiment of the disclosure, the MDT task parameter configured by the element manager may be received by the eNB.

It should be noted that, according to the embodiment of the disclosure, the measurement item related to the uplink coverage may further include a power headroom.

In the step 102, the eNB collects an MDT parameter based on the MDT task parameter.

According to the embodiment of the disclosure, the eNB may collect, based on the MDT task parameter, the MDT parameter from parameters related to MDT UE. The MDT parameter may include, for example, a maximum available output power $P_{CMAX}$ of the UE, the number $M_{PUSCH}(i)$ of resource block(s) validated in an ith frame and allocated for the PUSCH, an initial value $P_{O\_PUSCH}(j)$ of the power of the PUSCH of the UE, a compensation factor $\alpha(j)$ of the pathloss, an adjustment $\Delta_{TF}(i)$ for the power based on a modulation and coding scheme (MCS) of the ith frame, and a correction value $f(i)$ based on a Transmission Power Control (TPC) command in case of the ith frame. Here, j represents a preset transmission approach. In the case that j equals 0, it is indicated that a PUSCH transmission carrying persistent scheduling and non-adaptive retransmission is applied. In the case that j equals to 1, it is indicated that a PUSCH transmission carrying dynamic scheduling and adaptive retransmission is applied. In the case that j equals to 2, it is indicated that a PUSCH transmission carrying a random access message 3 is applied.

It should be noted that, according to the embodiment of the disclosure, the type of the MDT parameter needed to be collected may be determined based on the measurement item related to the uplink coverage, which is detailed according to the following embodiments and is not described here.

According to the embodiment of the disclosure, the eNB may choose an UE for performing the minimized drive test, i.e., the MDT UE, after receiving the MDT parameter configured by the element manager. The eNB may choose all or a few of the UE in a coverage of the eNB as the MDT UE. It should be noted that, unless specified otherwise, the UE referred to in the embodiment of the disclosure means the MDT UE.

It should be noted that, according to the embodiment of the disclosure, the UE in the coverage of the eNB may report a parameter of the UE itself to the eNB. The eNB may choose the UE and then perform, based on the MDT task parameter, a parameter collection from the parameter reported by the chosen UE. Alternatively, the eNB may configure the MDT task parameter and then send the configured MDT task parameter to the chosen UE. The chosen MDT UE performs, based on the MDT task parameter, a parameter collection and then reports the collected MDT parameter to the eNB.

In the step 103, the eNB calculates, based on the MDT parameter, the measurement result of the measurement item related to the uplink coverage, saves the measurement result of the measurement item related to the uplink coverage in an MDT measurement report, and sends the MDT measurement report to a trace collection entity TCE. Alternatively, the eNB saves the MDT parameter in the MDT measurement report and sends the measurement report to the TCE, and accordingly, the TCE may calculate, based on the MDT parameter saved in the MDT measurement report, the measurement result of the measurement item related to the uplink coverage.

According to the embodiment of the disclosure, after collecting the MDT parameter, the eNB may calculate the measurement result of the measurement item related to the uplink coverage based on the MDT parameter, save the measurement result of the measurement item related to the uplink coverage in the MDT measurement report, and send the MDT measurement report to the TCE. Accordingly, the TCE may obtain the measurement result of the measurement item related to the uplink coverage of the UE.

Alternatively, according to an embodiment of the disclosure, after collecting the MDT parameter, the eNB may save the MDT parameter in the MDT measurement report and send the MDT measurement report to the TCE. Accordingly, the TCE may calculate, based on the MDT parameter saved in the MDT measurement report, the measurement result of the measurement item related to the uplink coverage.

According to the embodiment of the disclosure, the MDT task parameter configured by the element manager and received by the eNB includes the measurement item related to the uplink coverage. The eNB may collect the MDT parameter based on the MDT task parameter, calculate based on the MDT parameter the measurement result of the measurement item related to the uplink coverage, and send the measurement result of the measurement item related to the uplink coverage to the TCE. Alternatively, the eNB sends the MDT parameter to the TCE, and accordingly, the TCE calculates, based on the MDT parameter, the measurement result of the measurement item related to the uplink coverage. Since the measurement item related to the uplink coverage includes at least one of the power headroom, the uplink pathloss, the power of the PUSCH for each resource block and the power of the PUCCH, the uplink pathloss or an uplink interference of the UE may be precisely determined by a coverage optimization application in the TCE layer, to precisely identify the problem in the uplink coverage of the UE.

Figure 2:
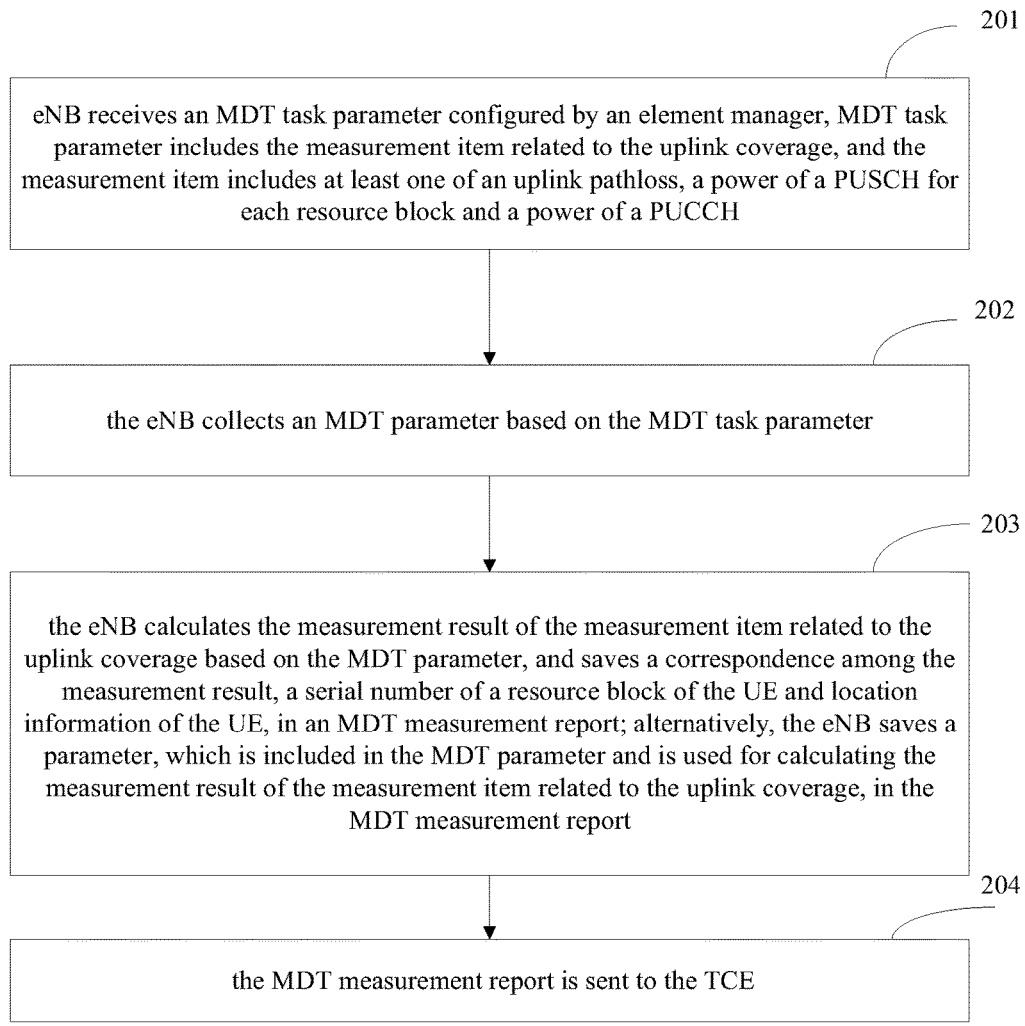
FIG. 2 is a flow chart of a method for obtaining and reporting a measurement result of a measurement item related to an uplink coverage according to another embodiment of the disclosure.

For better understanding the technical solution according to the embodiments of the disclosure, a method for obtaining and reporting a measurement result of a measurement item related to an uplink coverage according to an embodiment of the disclosure, as shown in FIG. 2, includes steps 201 to 204.

In the step 201, eNB receives an MDT task parameter configured by an element manager. The MDT task parameter includes the measurement item related to the uplink coverage, and the measurement item includes at least one of an uplink pathloss, a power of a PUSCH for each resource block and a power of a PUCCH.

In the step 202, the eNB collects an MDT parameter based on the MDT task parameter.

The steps 201 and 202 according to the embodiment, similar as the steps 101 and 102 shown in FIG. 1, are not detailed here.

It should be noted that, according to the embodiment of the disclosure, the measurement item related to the uplink coverage may further include a power headroom.

In the step 203, the eNB calculates, based on the MDT parameter, the measurement result of the measurement item related to the uplink coverage, and saves a correspondence among the measurement result, a serial number of a resource block of the UE and location information of the UE, in an MDT measurement report. Alternatively, the eNB saves a parameter, which is included in the MDT parameter and is used for calculating the measurement result of the measurement item related to the uplink coverage, in the MDT measurement report.

According to the embodiment of the disclosure, the eNB may calculate the measurement result of the measurement item related to the uplink coverage based on the MDT parameter. The measurement item related to the uplink coverage includes at least one of the uplink pathloss, the power of the PUSCH for each resource block and the power of the PUCCH. The measurement item related to the uplink coverage may further include the power headroom.

Approaches for eNB to calculate, based on the MDT parameter, the measurement results of the power headroom, the uplink pathloss, the power of the PUSCH for each resource block and the power of the PUCCH are detailed hereinafter.

1) In the case that the measurement item related to the uplink coverage includes the uplink pathloss, the eNB may calculate the uplink pathloss with any one of the following approaches A and B.

In the approach A, the eNB collects a downlink reference signal receiving power (RSRP) and calculates a downlink pathloss based on the RSRP. In the case that the UE is located in a Frequency Division Duplexing (FDD) network, it is determined that the uplink pathloss of the UE equals to a sum of the calculated downlink pathloss of the UE and a preset correction value. Alternatively, in the case that the UE is located in a Time Division Duplexing (TDD) network, it is determined that the uplink pathloss of the UE equals to the downlink pathloss of the UE.

In the approach B, the eNB calculates the downlink pathloss of the UE with the following equation:

$$PL = \{P_{CMAX} - PH - 10\lg(M_{PUSCH}(i)) - P_{O\_PUSCH}(j) - \Delta_{TF}(i) - f(i)\}/\alpha(j); \quad \text{equation (1)}$$

where PL represents the downlink pathloss of the UE, $P_{CMAX}$ represents a maximum available output power of the UE, $M_{PUSCH}(i)$ represents the number of resource block(s) validated in an ith frame and allocated for the PUSCH, PH represents the power headroom, $P_{O\_PUSCH}(j)$ represents an initial value of the power of the PUSCH, $\alpha(j)$ represents a compensation factor for the pathloss, j represents a preset transmission approach, $\Delta_{TF}(i)$ represents an adjustment for the power based on a modulation and coding scheme (Modulation and Coding Scheme, MCS) of the ith frame, and f(i) represents a correction value based on a Transmission Power Control TPC command in case of the ith frame.

It should be noted that, according to the embodiment of the disclosure, j may be set as at least one of 0, 1 or 2. In the case that j equals to 0, it is indicated that a PUSCH transmission carrying a persistent scheduling and a non-adaptive retransmission is applied. In the case that j equals to 1, it is indicated that a PUSCH transmission carrying a dynamic scheduling and an adaptive retransmission is applied. In the case that j equals to 2, it is indicated that a PUSCH transmission carrying a random access message 3 is applied. In practice, j may be set based on conditions. For example, j may be set as 0 and 1 to calculate compensation factors for the pathloss, and accordingly, a compensation factor α(0) in case of the PUSCH transmission carrying the persistent scheduling and the non-adaptive retransmission, and a compensation factor α(1) in case of the PUSCH transmission carrying the dynamic scheduling and the adaptive retransmission may be obtained.

It should be noted that, according to the embodiment of the disclosure, the UE may send a power headroom report including the PH to the eNB through an air interface following the MAC protocol, and accordingly, eNB obtains the PH of the UE. Other parameters such as $M_{PUSCH}(i)$, $P_{OPUSCH}(j)$, $\alpha(j)$, $\Delta_{TF}(i)$ and f(i) are MDT parameters or are set by eNB. In the case that eNB is a base station in R8 version, $P_{CMAX}$ is preset by eNB. In the case that eNB is a base station in R10 version, UE may send $P_{CMAX}$ to eNB, and accordingly, eNB may calculate the downlink pathloss of the UE with the equation (1).

After the downlink pathloss of the UE is calculated with the equation (1), the uplink pathloss of the UE is determined as being equal to a sum of the calculated downlink pathloss of the UE and a preset correction value in the case that the UE is located in an FDD network, or the uplink pathloss of the UE is determined as being equal to the downlink pathloss of the UE in the case that the UE is located in a TDD network.

2) In the case that the measurement item related to the uplink coverage includes the power of the PUSCH for each resource block, eNB may calculate, based on the MDT parameter, the PUSCH for each resource block with at least one of the following equations:

$$P_{RB\_PUSCH}=P_{O\_PUSH}(j)+\alpha(j)*PL+\Delta_{TF}(i)+f(i) \quad \text{equation (2)}$$

$$P_{RB\_PUSCH}=P_{O\_PUSH}(j)+\alpha(j)*PL+\Delta_{TF}(i) \quad \text{equation (3)}$$

$$P_{RB\_PUSCH}=P_{O\_PUSH}(j)+\alpha(j)*PL \quad \text{equation (4)}$$

$$P_{RB\_PUSCH}=P_{O\_PUSH}(j)+\alpha(j)*PL+f(i) \quad \text{equation (5)}$$

where $P_{RB\_PUSCH}$ represents the power of the PUSCH for each resource block, $P_{O\_PUSCH}(j)$ represents an initial value of the power of the PUSCH, α(j) represents a compensation factor for the pathloss, j represents a preset transmission approach, $\Delta_{TF}(i)$ represents an adjustment for the power based on the modulation and coding scheme MCS of the ith frame, and f(i) represents a correction value based on a TPC command in case of the ith frame.

It should be noted that, according to the embodiment of the disclosure, powers of the PUSCH for each resource block calculated with the equations (2) to (5) have different representations from each other. In the case that $P_{RB\_PUSCH}$ is calculated with the equation (2), both an effect of the MCS and an effect of the TPC are taken into consideration. In the case that $P_{RB\_PUSCH}$ is calculated with the equation (3), the effect of the MCS is taken into consideration while the effect of TPC is not. In the case that $P_{RB\_PUSCH}$ is calculated with the equation (4), neither the effect of the MCS nor the effect of the TPC is taken into consideration. In the case that $P_{RB\_PUSCH}$ is calculated with the equation (5), the effect of the TPC is taken into consideration while the effect of the MCS is not.

It should be noted that, in practice, at least one of the equations (2) to (5) may be chosen as needed to obtain the power of the PUSCH for each resource block under different conditions.

3) In the case that the measurement item includes the power headroom, eNB may calculate the power headroom based on the MDT parameter with the following equation:

$$PH=P_{CMAX}-P_{RB\_PUSCH} \quad \text{equation (6)}$$

or with the following equation:

$$PH=P_{POWERCLASS}-P_{RB\_PUSCH} \quad \text{equation (7)}$$

where PH represents the power headroom, $P_{CMAX}$ represents a maximum available output power of the UE, $P_{RB\_PUSCH}$ represents the power of the PUSCH for each resource block, and $P_{POWERCLASS}$ represents a power class of the UE.

It should be noted that, $P_{RB\_PUSCH}$ in the equation (6) or the equation (7) may be obtained with any one of the equations (2) to (5), which may be chosen based on conditions and is not limited here.

It should be noted that, in the case that the measurement item includes the power headroom but does not include the power of the PUSCH for each resource block, the UE may calculate the power of the PUSCH for each resource block with any one of the equations (2) to (5), and then calculate the power headroom with the equation (6) or the equation (7).

It should be noted that, according to the embodiment of the disclosure, the power headroom may be obtained with other approaches. For example, UE sends a power headroom report including the PH to the eNB through an air interface following the MAC protocol, and accordingly, eNB extracts PH from the report. Alternatively, eNB may collect a downlink RSRP of the UE and calculate PH of the UE based on the RSRP.

4) In the case that the measurement item includes the power of the PUCCH, eNB may calculate the power of the PUCCH based on the MDT parameter with at least one of the following equations:

$$P_{PUCCH}=P_{0\_PUCCH}+PL+g(i) \quad \text{equation (8)}$$

$$P_{PUCCH}=P_{0\_PUCCH}+PL \quad \text{equation (9)}$$

$$P_{PUCCH}=\min\{P_{CMAX}, P_{0\_PUCCH}+PL+h(n_{CQI},n_{HARQ})+\Delta_{F\_PUCCH}(F)+g(i)\} \quad \text{equation (10)}$$

where $P_{PUCCH}$ represents the power of the PUCCH, $P_{O\_PUCCH}$ represents an initial value of the power of the PUCCH, g(i) represents a correction value based on a TPC command in case of an ith frame, $P_{CMAX}$ represents a maximum available output power of the UE, and both $h(n_{CQI},n_{HARQ})$ and $\Delta_{F\_PUCCH}(F)$ represent correction values based on a format of the PUCCH.

It should be noted that, according to the embodiment of the disclosure, powers of the PUCCH calculated with the equations (8) to (10) have different representations from each other. In the case that the power of the PUCCH is calculated with the equation (8), an effect of the TPC is taken into consideration while an effect of the format of the PUCCH is not. In the case that the power of the PUCCH is calculated with the equation (9), neither the effect of the format of the PUCCH nor the effect of the TPC is taken into consideration. In the case that the power of the PUCCH is calculated with the equation (10), both the effect of the TPC and the effect of the format of the PUCCH are taken into consideration. In practice, at least one of the equations (8) to (10) may be chosen to obtain the corresponding $P_{PUCCH}$, which is not limited here.

It should be noted that, according to the embodiment of the disclosure, the measurement item related to the uplink coverage includes at least one of the uplink pathloss, the power of the PUSCH for each resource block and the power of the PUCCH. eNB may choose corresponding approach(es) based on the specific parameter included in the measurement item related to the uplink coverage to obtain the measurement result of the parameter. For example, in the case that the measurement item related to the uplink coverage includes the uplink pathloss and the power of the PUSCH for each resource block, eNB calculates the measurement results of the uplink pathloss and the power of the PUSCH for each resource block with the approaches described in 1) and 2).

It should be noted that, according to the embodiment of the disclosure, eNB may save the obtained measurement result of the measurement item related to the uplink coverage in the MDT measurement report. Preferably, eNB may further save a correspondence among the measurement result of the measurement item related to the uplink coverage, a serial number of a resource block of the UE and location information of the UE, in the MDT measurement report. The serial number of the resource block of the UE and the location information of the UE are both MDT parameters.

It should be noted that, according to the embodiment of the disclosure, eNB may further save a parameter, which is included in the MDT parameter and is used for calculating the measurement item related to the uplink coverage, in the MDT measurement report, and accordingly, a TCE receiving the MDT measurement report may extract the parameter for calculating the measurement item related to the uplink coverage and obtain the measurement result of the measurement item related to the uplink coverage based on the parameter.

According to the embodiment of the disclosure, the parameter for calculating the measurement item related to the uplink coverage includes at least one of the maximum available output power $P_{CMAX}$ of the UE, the number $M_{PUSCH}(i)$ of the resource block(s) validated in the ith frame and allocated for the PUSCH, the initial value $P_{O\_PUSCH}(j)$ of the power of the PUSCH, the compensation factor $\alpha(j)$ for the pathloss, the preset transmission approach j, the adjustment $\Delta_{TF}(i)$ for the power based on the modulation and coding scheme MCS of the ith frame, the correction value f(i) based on the Transmission Power Control TPC command in case of the ith frame, the initial value $P_{O\_PUCCH}$ of the power of the PUCCH, and the correction values $h(n_{CQI}, n_{HARQ})$ and $\Delta_{F\_PUCCH}(F)$ based on the format of the PUCCH.

It should be noted that, according to the embodiment of the disclosure, the specific type of the parameter for calculating the measurement item related to the uplink coverage is associated with the type of the measurement item related to the uplink coverage and specific approaches for calculating. In practice, the type of the parameter for calculating the measurement item related to the uplink coverage may be determined based on conditions, which is not limited here.

It should be noted that, according to the embodiment of the disclosure, in the case that the TCE calculates the measurement item related to the uplink coverage, based on the parameter for calculating the measurement item related to the uplink coverage included in the MDT measurement report, the TCE may calculate the measurement item related to the uplink coverage with the approaches described in 1) to 4), which is not limited here.

In the step 204, the MDT measurement report is sent to the TCE.

According to the embodiment of the disclosure, eNB sends the MDT measurement report to the TCE, and accordingly, the TCE may extract, from the MDT measurement report, the measurement result of the measurement item related to the uplink coverage. Alternatively, the TCE calculates the measurement result of the measurement item related to the uplink coverage, based on the parameter for calculating the measurement result of the measurement item related to the uplink coverage included in the MDT measurement report.

According to the embodiment of the disclosure, after receiving the MDT task parameter configured by the element manager, eNB may perform, according to the MDT task parameter, a parameter collection from parameters related to MDT UE, obtain, based on the collected MDT parameter, the measurement result of the measurement item related to the uplink coverage, and send the MDT measurement report including the measurement result of the measurement item related to the uplink coverage, to the TCE. Alternatively, eNB may save the MDT parameter in the MDT measurement report to send the MDT measurement report to the TCE, and accordingly, the TCE calculates, based on the MDT parameter, the measurement result of the measurement item related to the uplink coverage. Since the measurement item related to the uplink coverage includes at least one of the power headroom, the uplink pathloss, the power of the PUSCH for each resource block and the power of the PUCCH, a coverage optimization application in a TCE layer may determine the uplink pathloss and an uplink interference of the UE precisely, to precisely identify a problem in the uplink coverage of the UE.

Figure 3:
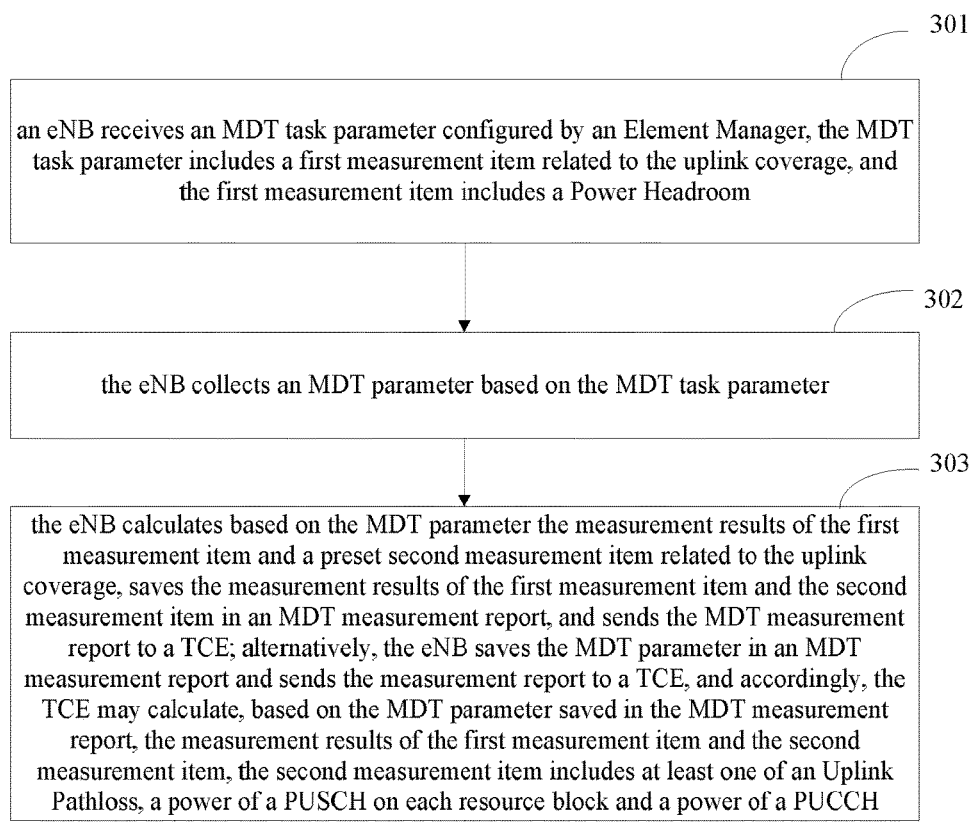
FIG. 3 is a flow chart of a method for obtaining and reporting a measurement result of a measurement item related to an uplink coverage according to another embodiment of the disclosure.

In FIG. 1 and FIG. 2, it is described the methods for eNB to obtain and report the measurement result of the measurement item related to the uplink coverage in the case that the measurement item included in the MDT task parameter includes at least one of the uplink pathloss, the power of the PUSCH for each resource block and the power of the PUCCH. A method for the eNB to obtain and report a measurement result of a measurement item related to an uplink coverage in the case that the measurement item included in an MDT task parameter includes a power headroom, is described hereinafter. A method for obtaining and reporting a measurement result of a measurement item related to an uplink coverage as shown in FIG. 3 includes steps 301 to 303.

In the step 301, an eNB receives an MDT task parameter configured by an element manager. The MDT task parameter includes a first measurement item related to the uplink coverage. The first measurement item includes a power headroom.

According to the embodiment of the disclosure, eNB may receive the MDT task parameter configured by the element manager. The MDT task parameter includes the first measurement item related to the uplink coverage. The first measurement item is the power headroom.

In the step 302, eNB collects an MDT parameter based on the MDT task parameter.

According to the embodiment of the disclosure, eNB collects the MDT parameter based on the MDT task parameter. For example, eNB may collect, the MDT parameter from parameters related to MDT UE based on the MDT task parameter. The MDT parameter may include, for example, a maximum available output power $P_{CMAX}$ of the UE, the number $M_{PUSCH}(i)$ of resource block(s) validated in an ith frame and allocated for the PUSCH, an initial value $P_{O\_PUSCH}(j)$ of the power of the PUSCH of the UE, a compensation factor $\alpha(j)$ of the pathloss, an adjustment $\Delta_{TF}(i)$ for the power based on a modulation and coding scheme (MCS) of the ith frame, and a correction value f(i) based on a Transmission Power Control (TPC) command in case of the ith frame. Here, j represents a preset transmission approach. In the case that j equals 0, it is indicated that a PUSCH transmission carrying a persistent scheduling and a non-adaptive retransmission is applied. In the case that j equals to 1, it is indicated that a PUSCH transmission carrying a dynamic scheduling and an adaptive retransmission is applied. In the case that j equals to 2, it is indicated that a PUSCH transmission carrying a random access message 3 is applied.

In the step 303, eNB calculates, based on the MDT parameter, the measurement results of the first measurement item and a preset second measurement item related to the uplink coverage, saves the measurement results of the first measurement item and the second measurement item in an MDT measurement report, and sends the MDT measurement report to a TCE. Alternatively, eNB saves the MDT parameter in an MDT measurement report and sends the measurement report to a TCE, and accordingly, the TCE may calculate, based on the MDT parameter saved in the MDT measurement report, the measurement results of the first measurement item and the second measurement item. The second measurement item includes at least one of an uplink pathloss, a power of a PUSCH for each resource block and a power of a PUCCH.

According to the embodiment of the disclosure, the second measurement item related to the uplink coverage may be preset in eNB. The uplink pathloss and an uplink interference of the UE may be determined by a coverage optimization application in a TCE layer based on the measurement result of the second measurement item and the measurement result of the first measurement item which is configured in a first MDT task parameter. The second measurement item includes at least one of the uplink pathloss, the power of the PUSCH for each resource block and the power of the PUCCH.

According to the embodiment of the disclosure, eNB may calculate the measurement results of the first measurement item and the second measurement item based on the collected MDT parameter. An approach for obtaining the measurement result of the first measurement item, i.e., the power headroom, is similar as the approach described in 2) in connected with the step 203 shown in FIG. 2, which is not detailed here.

According to the embodiment of the disclosure, in the case that the second measurement item includes the uplink pathloss, an approach for eNB to obtain the measurement result of the uplink pathloss is similar as the approach described in 1) in connecting with the step 203 shown in FIG. 2, which is not detailed here.

According to the embodiment of the disclosure, in the case that the second measurement item includes the power of the PUSCH for each resource block, an approach for eNB to obtain the measurement result of the power of the PUSCH for each resource block is similar as the approach described in 2) in connection with the step 203 shown in FIG. 2, which is not detailed here.

According to the embodiment of the disclosure, in the case that the second measurement item includes the power of the PUCCH, an approach for eNB to obtain the measurement of the power of the PUCCH is similar as the approach described in 4) of in connection with the step 203 shown in FIG. 2, which is not detailed here.

According to the embodiment of the disclosure, eNB may save the MDT parameter in the MDT measurement report and send the MDT measurement report to the TCE, and accordingly, the TCE may calculate the measurement results of the first measurement item and the second measurement item based on the MDT parameter saved in the MDT measurement report. It should be noted that, the TCE may use the approaches described in 1) to 10) to calculate the corresponding measurement items related to the uplink coverage, which is not detailed here.

According to the embodiment of the disclosure, by presetting the second measurement item related to the uplink coverage, and by configuring the first measurement item related to the uplink coverage in the MDT task parameter, eNB may calculate the measurement results of the first measurement item and the second measurement item after collecting the MDT parameter and send the measurement results to the TCE. Alternatively, eNB sends the MDT parameter to the TCE, and accordingly, the TCE calculates, based on the MDT parameter, the measurement results of the first measurement item and the second measurement item. Since the second measurement item includes at least one of the uplink pathloss, the power of the PUSCH for each resource block and the power of the PUCCh, the uplink pathloss and an uplink interference of the UE may be precisely determined with a coverage optimization application in a TCE layer, to precisely identify a problem in the uplink coverage of the UE.

Figure 4:
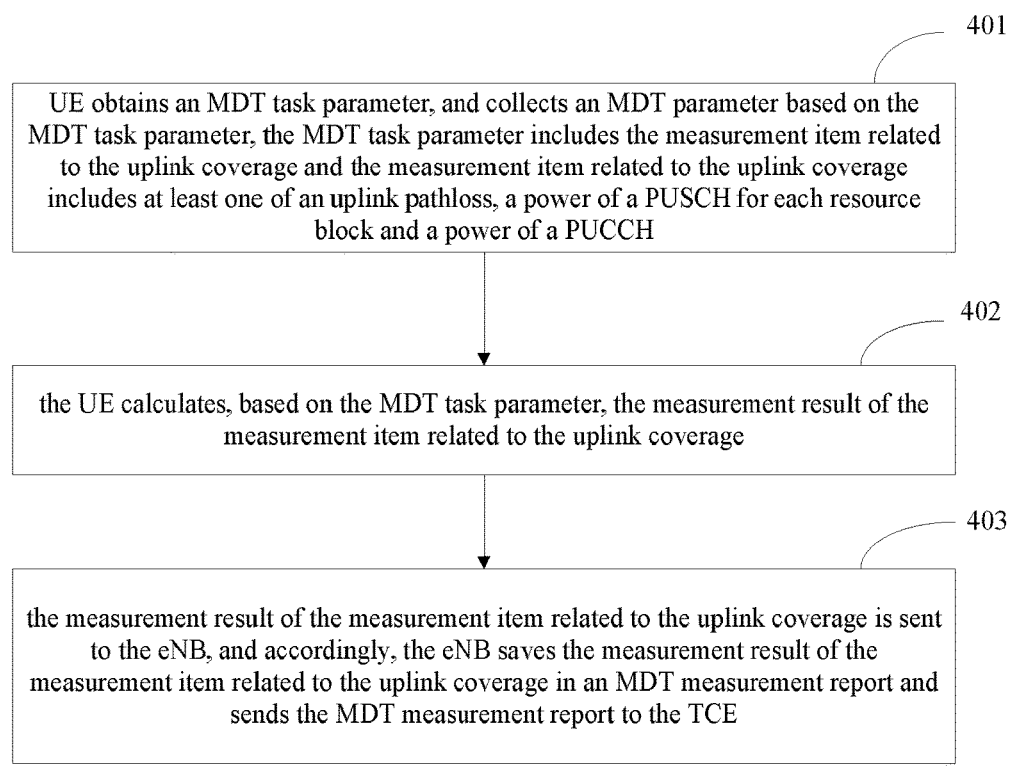
FIG. 4 is a flow chart of a method for obtaining and reporting a measurement result of a measurement item related to an uplink coverage according to another embodiment of the disclosure.

According to the embodiments of the disclosure, the method for obtaining and reporting the measurement result of the measurement item related to the uplink coverage is described from the side of eNB in conjunction with FIGS. 1-3. In the following, the method for obtaining and reporting the measurement result of the measurement item related to the uplink coverage is described from the side of the UE. As shown in FIG. 4, the method includes steps 401 to 403.

In the step 401, UE obtains an MDT task parameter, and collects an MDT parameter based on the MDT task parameter. The MDT task parameter includes the measurement item related to the uplink coverage. The measurement item related to the uplink coverage includes at least one of an uplink pathloss, a power of a PUSCH for each resource block and a power of a PUCCH.

According to the embodiment of the disclosure, an element manager may configure, through a network management interface, the MDT task parameter for an eNB. The MDT task parameter includes the measurement item related to the uplink coverage. The measurement item related to the uplink coverage includes at least one of the uplink pathloss, the power of the PUSCH for each resource block and the power of the PUCCH.

It should be noted that, according to the embodiment of the disclosure, the measurement item related to the uplink coverage may further include a power headroom.

eNB sends the MDT task parameter to the MDT UE, and accordingly, the UE may obtain the MDT task parameter and collect the MDT parameter based on the MDT task parameter.

In the step 402, the UE calculates, based on the MDT task parameter, the measurement result of the measurement item related to the uplink coverage.

According to the embodiment of the disclosure, after collecting the MDT parameter, the UE calculates, based on the MDT task parameter, the measurement result of the measurement item related to the uplink coverage.

5) In the case that the measurement item related to the uplink coverage includes the uplink pathloss, the UE may calculate the uplink pathloss with any one of the following approaches C and D.

In the approach C, the UE obtains a downlink RSRP and calculates a downlink pathloss based on the RSRP. In the case that the UE is located in an FDD network, it is determined by the UE that the uplink pathloss of the UE equals to a sum of the calculated downlink pathloss and a preset correction value. Alternatively, in the case that the UE is located in a TDD network, it is determined by the UE that the uplink pathloss equals to the calculated downlink pathloss.

In the approach D, the UE calculates the downlink pathloss based on the collected MDT parameter with the following equation:

$$PL = \{P_{CMAX} - PH - 10 \lg(M_{PUSCH}(i)) - P_{O\_PUSCH}(j) \quad \Delta_{TF}(i) - f(i)\}/\alpha(j); \qquad \text{equation (1)}$$

where PL represents the downlink pathloss of the UE, $P_{CMAX}$ represents a maximum available output power of the UE, $M_{PUSCH}$ represents the number of resource block(s) validated in an ith frame and allocated for the PUSCH, PH represents the power headroom, $P_{O\_PUSCH}(j)$ represents an initial value of the power of the PUSCH, $\alpha(j)$ represents a compensation factor for the pathloss, j represents a preset transmission approach, $\Delta_{TF}(i)$ represents an adjustment for the power based on the modulation and coding scheme (MCS) of the ith frame, and f(i) represents a correction value based on a Transmission Power Control TPC command in case of the ith frame.

It should be noted that, according to the embodiment of the disclosure, j may be set as at least one of 0, 1 or 2. In the case that j equals to 0, it is indicated that a PUSCH transmission carrying a persistent scheduling and a non-adaptive retransmission is applied. In the case that j equals to 1, it is indicated that a PUSCH transmission carrying a dynamic scheduling and an adaptive retransmission is applied. In the case that j equals to 2, it is indicated that a PUSCH transmission carrying a random access message 3 is applied. In practice, j may be set based on conditions. For example, j may be set as 0 and 1 to calculate compensation factors for the pathloss, and accordingly, a compensation factor $\alpha(0)$ in case of the PUSCH transmission carrying the persistent scheduling and the non-adaptive retransmission, and a compensation factor $\alpha(1)$ in case of the PUSCH transmission carrying the dynamic scheduling and the adaptive retransmission may be obtained.

After the downlink pathloss of the UE is calculated with the equation (1), the UE determines that the uplink pathloss equals to a sum of the obtained downlink pathloss and the preset correction value in the case that the UE is located in the FDD network, or the UE determined that the uplink pathloss equals to the downlink pathloss in the case that the UE is located in the TDD network.

6) In the case that the measurement item related to the uplink coverage includes the power of the PUSCH for each resource block, the UE may calculate based on the MDT parameter to obtain the power of the PUSCH for each resource block with at least one of the following equations:

$$P_{RB\_PUSCH} = P_{O\_PUSH}(j(+\alpha(j)*PL + \Delta_{TF}(i) + f(i)) \qquad \text{equation (2)}$$

$$P_{RB\_PUSCH} = P_{O\_PUSH}(j) + \alpha(j)*PL + \Delta_{TF}(i) \qquad \text{equation (3)}$$

$$P_{RB\_PUSCH} = P_{O\_PUSH}(j) + \alpha(j)*PL \qquad \text{equation (4)}$$

$$P_{RB\_PUSCH} = P_{O\_PUSH}(j) + \alpha(j)*PL + f(i) \qquad \text{equation (5)}$$

where $P_{RB\_PUSCH}$ represents the power of the PUSCH for each resource block, $P_{O\_PUSCH}(j)$ represents an initial value of the power of the PUSCH, $\alpha(j)$ represents a compensation factor for the pathloss, j represents a preset transmission approach, $\Delta_{TF}(i)$ represents an adjustment for the power based on the modulation and coding scheme MCS of the ith frame, and f(i) represents a correction value based on a Transmission Power Control TPC command in case of the ith frame.

It should be noted that, according to the embodiment of the disclosure, powers of the PUSCH for each resource block calculated with the equations (2) to (5) have different representations from each other. In the case that $P_{RB\_PUSCH}$ is calculated with the equation (2), both an effect of the MCS and an effect of the TPC are taken into consideration. In the case that $P_{RB\_PUSCH}$ is calculated with the equation (3), the effect of the MCS is taken into consideration while the effect of TPC is not. In the case that $P_{RB\_PUSCH}$ is calculated with the equation (4), neither the effect of the MCS nor the effect of the TPC is taken into consideration. In the case that $P_{RB\_PUSCH}$ is calculated with the equation (5), the effect of the TPC is taken into consideration while the effect of the MCS is not.

It should be noted that, in practice, at least one of the equations (2) to (5) may be chosen as needed to obtain the power of the PUSCH for each resource block under different conditions.

7) In the case that the measurement item includes the power headroom, the UE may calculate the power headroom based on the MDT parameter with the following equation:

$$PH = P_{CMAX} - P_{RB\_PUSCH} \qquad \text{equation (6)}$$

or with the following equation:

$$PH = P_{POWERCLASS} - P_{RB\_PUSCH} \qquad \text{equation (7)}$$

where PH represents the power headroom, $P_{CMAX}$ represents a maximum available output power of the UE, $P_{RB\_PUSCH}$ represents the power of the PUSCH for each resource block, and $P_{POWERCLASS}$ represents a power class of the UE.

It should be noted that, $P_{RB\_PUSCH}$ in the equation (6) or the equation (7) may be obtained with any one of the equations (2) to (5), which may be chosen based on conditions and is not limited here.

It should be noted that, in the case that the measurement item includes the power headroom but does not include the power of the PUSCH for each resource block, the UE may calculate the power of the PUSCH for each resource block with any one of the equations (2) to (5), and then calculate the power headroom with the equation (6) or the equation (7).

It should be noted that, according to the embodiment of the disclosure, the power headroom may be obtained with other approaches. For example, the UE calculates PH of the UE based on a downlink RSRP of the UE.

8) In the case that the measurement item includes the power of the PUCCH, the UE may calculate based on the MDT parameter to obtain the power of the PUCCH with at least one of the following equations:

$$P_{PUCCH} = P_{O\_PUCCH} + PL + g(i) \qquad \text{equation (8)}$$

$$P_{PUCCH} = P_{O\_PUCCH} + PL \qquad \text{equation (9)}$$

$$P_{PUCCH} = \min\{P_{CMAX}, P_{O\_PUCCH} + PL + h(n_{CQI}, n_{HARQ}) + \Delta_{F\_PUCCH}(F) + g(i)\} \qquad \text{equation (10)}$$

where $P_{PUCCH}$ represents the power of the PUCCH, $P_{O\_PUCCH}$ represents an initial value of the power of the PUCCH, $g(i)$ represents a correction value based on a TPC command in case of an ith frame, $P_{CMAX}$ represents a maximum available output power of the UE, and both $h(n_{CQI}, n_{HARQ})$ and $\Delta_{F\_PUCCH}(F)$ represent correction values based on a format of the PUCCH.

It should be noted that, according to the embodiment of the disclosure, powers of the PUCCH calculated with the equations (8) to (10) have different representations from each other. In the case that the power of the PUCCH is calculated with the equation (8), an effect of the TPC is taken into consideration while an effect of the format of the PUCCH is not. In the case that the power of the PUCCH is calculated with the equation (9), neither the effect of the format of the PUCCH nor the effect of the TPC is taken into consideration. In the case that the power of the PUCCH is calculated with the equation (10), both the effect of the TPC and the effect of the format of the PUCCH are taken into consideration. In practice, at least one of the equations (8) to (10) may be chosen to obtain the corresponding $P_{PUCCH}$, which is not limited here.

It should be noted that, according to the embodiment of the disclosure, the measurement item related to the uplink coverage includes at least one of the uplink pathloss, the power of the PUSCH for each resource block and the power of the PUCCH. The UE may choose corresponding approach(es) based on the specific parameter included in the measurement item related to the uplink coverage to obtain the measurement result of the parameter. For example, in the case that the measurement item related to the uplink coverage includes the uplink pathloss and the power of the PUSCH for each resource block, the UE calculates the measurement results of the uplink pathloss and the power of the PUSCH for each resource block with the approaches described in 5) and 6).

In the step 403, the measurement result of the measurement item related to the uplink coverage is sent to eNB, and accordingly, eNB saves the measurement result of the measurement item related to the uplink coverage in an MDT measurement report and sends the MDT measurement report to the TCE.

According to the embodiment of the disclosure, the UE sends the measurement result of the measurement item related to the uplink coverage to eNB after obtaining the measurement result of the measurement item related to the uplink coverage. Accordingly, eNB saves the measurement result in the MDT measurement report and sends the MDT measurement report to the TCE.

According to the embodiment of the disclosure, after obtaining the MDT task parameter, the UE collects the MDT parameter based on the MDT task parameter, calculates, based on the collected MDT parameter, the measurement result of the measurement item related to the uplink coverage, and sends the measurement result to eNB. Accordingly, eNB may save the measurement result in the MDT measurement report to send the MDT measurement report to the TCE. Since the measurement item related to the uplink coverage includes at least one of the power headroom, the uplink pathloss, the power of the PUSCH for each resource block and the power of the PUCCH, the uplink pathloss and an uplink interference of the UE may be precisely determined with a coverage optimization application in a TCE layer, to precisely identify a problem in the uplink coverage of the UE.

A device for executing a method for obtaining and reporting a measurement result of a measurement item related to an uplink coverage, as described in the following, includes:

a processor adapted for obtaining an MDT parameter; and calculating the measurement result of the measurement item related to the uplink coverage based on the MDT parameter, or saving the MDT parameter in an MDT measurement report and sending the MDT measurement report to a trace collection entity TCE, so that the TCE obtains the MDT parameter from the received MDT measurement report and calculates the measurement result of the measurement item related to the uplink coverage based on the MDT parameter, where the measurement item related to the uplink coverage includes at least one of an uplink pathloss, a power of a PUSCH for each resource block and a power of a PUCCH; and a sender adapted for sending the measurement result of the measurement item related to the uplink coverage after the measurement result of the measurement item related to the uplink coverage is calculated by the processor, or sending the MDT measurement report after the MDT parameter is obtained and saved into the MDT measurement report by the processor.

The device may be a base station or user equipment, which may be detailed hereinafter.

Figure 5:
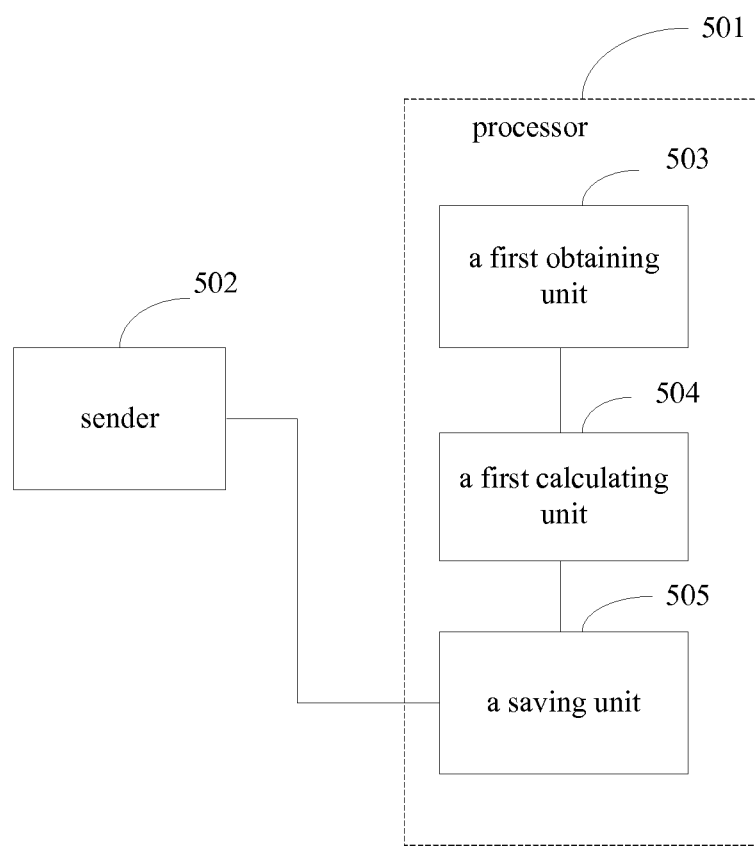
FIG. 5 is a schematic diagram of a base station according to an embodiment of the disclosure.

In the case that the device is the base station, reference may be made to FIG. 5, which shows a base station according to an embodiment of the disclosure including a processor 501 and a sender 502.

The processor 501 is adapted for obtaining an MDT parameter, and calculating, based on the MDT parameter, a measurement result of a measurement item related to an uplink coverage. The measurement item related to the uplink coverage includes at least one of an uplink pathloss, a power of a PUSCH for each resource block and a power of a PUCCH.

The sender 502 is adapted for sending the measurement result of the measurement item related to the uplink coverage after the measurement result of the measurement item related to the uplink coverage is calculated by the processor.

The processor 501 includes:

a first obtaining unit 503, for receiving an MDT task parameter configured by an element manager EM and collecting the MDT parameter based on the MDT task parameter;

a first calculating unit 504, for calculating the measurement result of the measurement item related to the uplink coverage based on the MDT parameter, after the MDT parameter is collected by the first obtaining unit; and a saving unit 505, for saving the measurement result of the measurement item related to the uplink coverage in the MDT measurement report, after the measurement result of the measurement item related to the uplink coverage is calculated by the first calculating unit.

It should be noted that, the measurement item related to the uplink coverage includes at least one of the uplink pathloss, the power of the PUSCH for each resource block and the power of the PUCCH. The measurement item related to the uplink coverage may further include a power headroom.

Approaches for the first calculating unit 504 to calculate the measurement result of the measurement item related to the uplink coverage based on the MDT parameter are detailed hereinafter.

In the case that the measurement item related to the uplink coverage includes the uplink pathloss, the first calculating unit 504 collects a downlink RSRP of UE and calculates a downlink pathloss of the UE based on the RSRP. In the case that the UE is located in an FDD network, it is determined that the uplink pathloss of the UE equals to a sum of the obtained downlink pathloss and a preset correction value. Alternatively, in the case that the UE is located in a TDD network, it is determined that the uplink pathloss of the UE equals to the downlink pathloss of the UE.

Alternatively, the first calculating unit 504 calculates the downlink pathloss of the UE based on the collected MDT parameter with the following equation:

$$PL = \{P_{CMAX} - PH - 10\lg(M_{PUSCH}(i)) - P_{O\_PUSCH}(j) - \Delta_{TF}(i) - f(i)\}/\alpha(j); \quad \text{equation (1)}$$

where PL represents the downlink pathloss of the UE, $P_{CMAX}$ represents a maximum available output power of the UE, $M_{PUSCH}(i)$ represents the number of resource block(s) validated in an ith frame and allocated for the PUSCH, PH represents the power headroom, $P_{O\_PUSCH}(j)$ represents an initial value of the power of the PUSCH, $\alpha(j)$ represents a compensation factor for the pathloss, j represents a preset transmission approach, $\Delta_{TF}(i)$ represents an adjustment for the power based on the modulation and coding scheme MCS of the ith frame, and f(i) represents a correction value based on a Transmission Power Control TPC command in case of the ith frame.

It should be noted that, according to the embodiment of the disclosure, j may be set as at least one of 0, 1 or 2. In the case that j equals to 0, it is indicated that a PUSCH transmission carrying a persistent scheduling and a non-adaptive retransmission is applied. In the case that j equals to 1, it is indicated that a PUSCH transmission carrying a dynamic scheduling and an adaptive retransmission is applied. In the case that j equals to 2, it is indicated that a PUSCH transmission carrying a random access message 3 is applied. In practice, j may be set based on conditions. For example, j may be set as 0 and 1 to calculate compensation factors for the pathloss, and accordingly, a compensation factor $\alpha(0)$ in case of the PUSCH transmission carrying the persistent scheduling and the non-adaptive retransmission, and a compensation factor $\alpha(1)$ in case of the PUSCH transmission carrying the dynamic scheduling and the adaptive retransmission may be obtained.

It should be noted that, according to the embodiment of the disclosure, the UE may send a power headroom report including the PH to the eNB through an air interface following the MAC protocol, and accordingly, eNB obtains PH of the UE. Other parameters such as $M_{PUSCH}(i)$, $P_{O\_PUSCH}(j)$, $\alpha(j)$, j, $\Delta_{TF}(i)$ and f(i) are MDT parameters or are set by eNB. In the case that eNB is a base station in R8 version, $P_{CMAX}$ is preset by eNB. In the case that eNB is a base station in R10 version, the UE may send $P_{CMAX}$ to eNB, and accordingly, eNB may calculate the downlink pathloss of the UE with the equation (1).

After the downlink pathloss of the UE is calculated with the equation (1), the first calculating unit 504 determines that the uplink pathloss of the UE equals to a sum of the obtained downlink pathloss of the UE and a preset correction value in the case that the UE is located in an FDD network, or the first calculating unit 504 determines that the uplink pathloss of the UE equals to the downlink pathloss of the UE in the case that the UE is located in a TDD network.

In the case that the measurement item related to the uplink coverage includes the power of the PUSCH for each resource block, the first calculating unit 504 may calculate the power of the PUSCH for each resource block based on the MDT parameter with at least one of the following equations:

$$P_{RB\_PUSCH} = P_{O\_PUSH}(j) + \alpha(j)*PL + \Delta_{TF}(i) + f(i) \quad \text{equation (2)}$$

$$P_{RB\_PUSCH} = P_{O\_PUSH}(j) + \alpha(j)*PL + \Delta_{TF}(i) \quad \text{equation (3)}$$

$$P_{RB\_PUSCH} = P_{OPUSH}(j) + \alpha(j)*PL \quad \text{equation (4)}$$

$$P_{RB\_PUSCH} = P_{O\_PUSH}(j) + \alpha(j)*PL + f(i) \quad \text{equation (5)}$$

where $P_{RB\_PUSCH}$ represents the power of the PUSCH for each resource block, $P_{O\_PUSCH}(j)$ represents an initial value of the power of the PUSCH, $\alpha(j)$ represents a compensation factor for the pathloss, j represents a preset transmission approach, $\Delta_{TF}(i)$ represents an adjustment for the power based on the modulation and coding scheme MCS of the ith frame, and f(i) represents a correction value based on a Transmission Power Control TPC command in case of the ith frame.

It should be noted that, according to the embodiment of the disclosure, powers of the PUSCH for each resource block calculated with the equations (2) to (5) have different representations from each other. In the case that $P_{RB\_PUSCH}$ is calculated with the equation (2), both an effect of the MCS and an effect of the TPC are taken into consideration. In the case that $P_{RB\_PUSCH}$ is calculated with the equation (3), the effect of the MCS is taken into consideration while the effect of TPC is not. In the case that $P_{RB\_PUSCH}$ is calculated with the equation (4), neither the effect of the MCS nor the effect of the TPC is taken into consideration. In the case that $P_{RB\_PUSCH}$ is calculated with the equation (5), the effect of the TPC is taken into consideration while the effect of the MCS is not.

It should be noted that, in practice, at least one of the equations (2) to (5) may be chosen as needed to obtain the power of the PUSCH for each resource block under different conditions.

In the case that the measurement item includes the power headroom, the first calculating unit 504 may calculate the power headroom based on the MDT parameter with the following equation:

$$PH = P_{CMAX} - P_{RB\_PUSCH} \quad \text{equation (6)}$$

or with the following equation:

$$PH = P_{POWERCLASS} - P_{RB\_PUSCH} \quad \text{equation (7)}$$

where PH represents the power headroom, $P_{CMAX}$ represents a maximum available output power of the UE, $P_{RB\_PUSCH}$ represents the power of the PUSCH for each resource block, and $P_{POWERCLASS}$ represents a power class of the UE.

It should be noted that, $P_{RB\_PUSCH}$ in the equation (6) or the equation (7) may be obtained with any one of the equations (2) to (5), which may be chosen based on conditions and is not limited here.

It should be noted that, in the case that the measurement item includes the power headroom but does not include the power of the PUSCH for each resource block, the first calculating unit 504 may calculate the power of the PUSCH for each resource block with any one of the equations (2) to (5), and then calculate the power headroom with the equation (6) or the equation (7).

It should be noted that, according to the embodiment of the disclosure, the power headroom may be obtained with other approaches. For example, the first calculating unit 504 may collect a downlink RSRP of the UE and calculate PH of the UE based on the RSRP.

In the case that the measurement item includes the power of the PUCCH, the first calculating unit 504 may calculate the power of the PUCCH based on the MDT parameter with at least one of the following equations:

$$P_{PUCCH}=P_{O\_PUCCH}+PL+g(i) \quad \text{equation (8)}$$

$$P_{PUCCH}=P_{O\_PUCCH}+PL \quad \text{equation (9)}$$

$$P_{PUCCH}=\min\{P_{CMAX},P_{O\_PUCCH}+PL+h(n_{CQI},n_{HARQ})+\Delta_{F\_PUCCH}(F)+g(i)\} \quad \text{equation (10)}$$

where $P_{PUCCH}$ represents the power of the PUCCH, $P_{O\_PUCCH}$ represents an initial value of the power of the PUCCH, g(i) represents a correction value based on a TPC command in case of an ith frame, $P_{CMAX}$ represents a maximum available output power of the UE, and both $h(n_{CQI},n_{HARQ})$ and $\Delta_{F\_PUCCH}(F)$ represent correction values based on a format of the PUCCH.

It should be noted that, according to the embodiment of the disclosure, powers of the PUCCH calculated with the equations (8) to (10) have different representations from each other. In the case that the power of the PUCCH is calculated with the equation (8), an effect of the TPC is taken into consideration while an effect of the format of the PUCCH is not. In the case that the power of the PUCCH is calculated with the equation (9), neither the effect of the format of the PUCCH nor the effect of the TPC is taken into consideration. In the case that the power of the PUCCH is calculated with the equation (10), both the effect of the TPC and the effect of the format of the PUCCH are taken into consideration. In practice, at least one of the equations (8) to (10) may be chosen to obtain the corresponding $P_{PUCCH}$, which is not limited here.

According to the embodiment of the disclosure, the MDT task parameter configured by the EM and received by eNB includes the measurement item related to the uplink coverage; eNB collects the MDT parameter based on the MDT task parameter, calculates, based on the MDT parameter, the measurement result of the measurement item related to the uplink coverage, and sends the measurement result of the measurement item related to the uplink coverage to the TCE. Since the measurement item related to the uplink coverage includes at least one of the power headroom, the uplink pathloss, the power of the PUSCH for each resource block and the power of the PUCCH, the uplink pathloss and an uplink interference of the UE may be precisely determined with a coverage optimization application in a TCE layer to precisely identify a problem in the uplink coverage of the UE.

Figure 6:
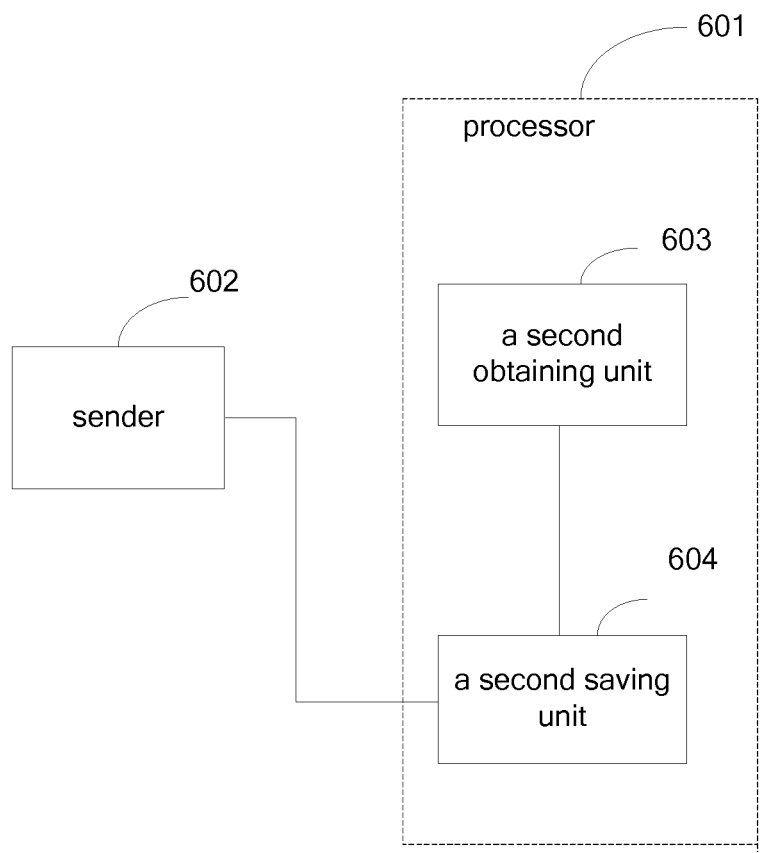
FIG. 6 is a schematic diagram of a base station according to another embodiment of the disclosure.

For better understanding the base station according to the embodiment of the disclosure, reference may be made to FIG. 6, which shows a base station according to an embodiment of the disclosure including a processor 601 and a sender 602.

The processor 601 is adapted for obtaining an MDT parameter, saving the MDT parameter in an MDT measurement report and sending the MDT measurement report to a trace collection entity TCE. Accordingly, the TCE obtains the MDT parameter from the received MDT measurement report and calculates, based on the MDT parameter, a measurement result of a measurement item related to an uplink coverage. The measurement item related to the uplink coverage includes at least one of an uplink pathloss, a power of a PUSCH for each resource block and a power of a PUCCH.

The sender 602 is adapted for sending the MDT measurement report after the MDT parameter is obtained and saved to the MDT measurement report by the processor.

The processor 601 includes:

a second obtaining unit 603, for receiving an MDT task parameter configured by an element manager EM and collecting the MDT parameter based on the MDT task parameter; and a second saving unit 604, for saving the MDT parameter in the MDT measurement report after the MDT parameter is collected by the second obtaining unit.

According to the embodiment of the disclosure, the MDT task parameter configured by the EM and received by eNB includes the measurement item related to the uplink coverage; eNB collects the MDT parameter based on the MDT task parameter, saves the MDT parameter in the MDT measurement report and sends the MDT measurement report to eNB. Since the measurement item related to the uplink coverage includes at least one of the power headroom, the uplink pathloss, the power of the PUSCH for each resource block and the power of the PUCCH, the uplink pathloss and an uplink interference of the UE may be precisely determined with a coverage optimization application in the TCE layer to precisely identify a problem in the uplink coverage of the UE.

Figure 7:
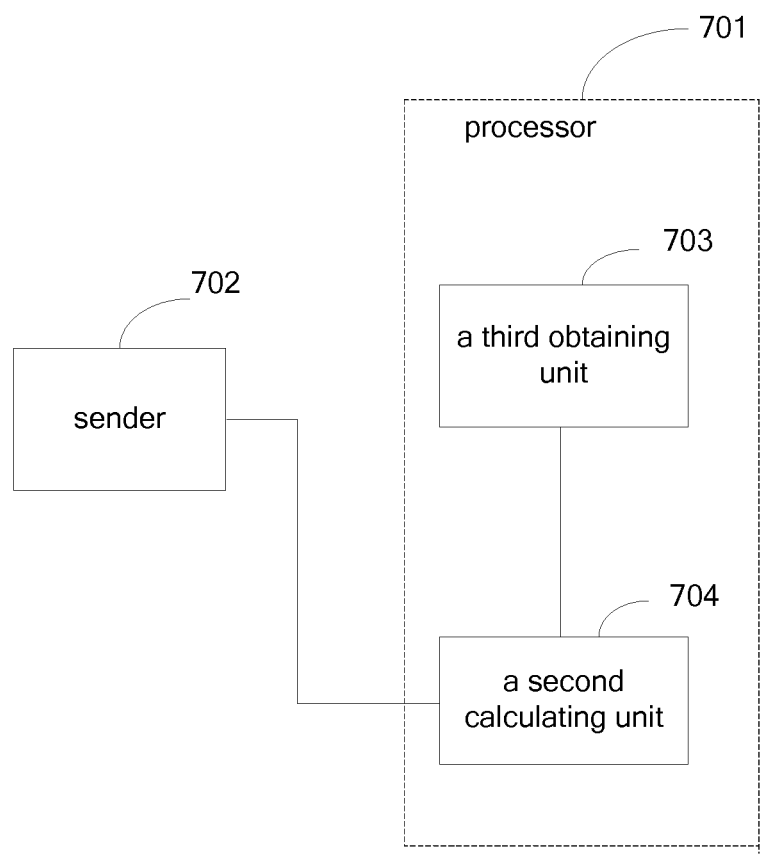
FIG. 7 is a schematic diagram of user equipment according to an embodiment of the disclosure.

Referring to FIG. 7, UE provided according to an embodiment of the disclosure includes a processor 701 and a sender 702.

The processor 701 is adapted for obtaining an MDT parameter, and calculating, based on the MDT parameter, a measurement result of a measurement item related to an uplink coverage. The measurement item related to the uplink coverage includes at least one of an uplink pathloss, a power of a PUSCH for each resource block and a power of a PUCCH.

The sender 702 is adapted for sending the measurement result of the measurement item related to the uplink coverage after the measurement result of the measurement item related to the uplink coverage is calculated by the processor.

The processor 701 includes:

a third obtaining unit 703, for obtaining an MDT task parameter and collecting the MDT parameter based on the MDT task parameter; and a second calculating unit 704, for calculating the measurement result of the measurement item related to the uplink coverage based on the MDT parameter, after the MDT parameter is obtained by the third obtaining unit.

It should be noted that, according to the embodiment of the disclosure, approaches for the second calculating unit 704 to calculate the measurement result of the measurement item related to the uplink coverage based on the MDT parameter are detailed as follows.

In the case that the measurement item related to the uplink coverage includes the uplink pathloss, the second calculating unit 704 may obtain a value of the uplink pathloss with any one of the two approaches described as follows.

The second calculating unit 704 calculates a downlink pathloss based on a downlink RSRP. In the case that the UE is located in an FDD network, the UE determines that the uplink pathloss of the UE equals to a sum of the obtained downlink pathloss and a preset correction value. Or, in the case that the UE is located in a TDD network, the UE determines that the uplink pathloss equals to the obtained downlink pathloss.

Alternatively, the second calculating unit 704 calculates the downlink pathloss of the UE based on the collected MDT parameter with the following equation:

$$PL=\{P_{CMAX}-PH-10lg(M_{PUSCH}(i))-P_{O\_PUSCH}(j)-\Delta_{TF}(i)-f(i)\}/\alpha(i), \quad \text{equation (1)}$$

where PL represents the downlink pathloss of the UE, $P_{CMAX}$ represents a maximum available output power of the UE, $M_{PUSCH}(i)$ represents the number of resource block(s) validated in an ith frame and allocated for the PUSCH, PH represents the power headroom, $P_{O\_PUSCH}(j)$ represents an initial value of the power of the PUSCH, $\alpha(j)$ represents a compensation factor for the pathloss, j represents a preset transmission approach, $\Delta_{TF}(i)$ represents an adjustment for the power based on the modulation and coding scheme MCS of the ith frame, and f(i) represents a correction value based on a Transmission Power Control TPC command in case of the ith frame.

It should be noted that, according to the embodiment of the disclosure, j may be set as at least one of 0, 1 or 2. In the case that j equals to 0, it is indicated that a PUSCH transmission carrying a persistent scheduling and a non-adaptive retransmission is applied. In the case that j equals to 1, it is indicated that a PUSCH transmission carrying a dynamic scheduling and an adaptive retransmission is applied. In the case that j equals to 2, it is indicated that a PUSCH transmission carrying a random access message 3 is applied. In practice, j may be set based on conditions. For example, j may be set as 0 and 1 to calculate compensation factors for the pathloss, and accordingly, a compensation factor $\alpha(0)$ in case of the PUSCH transmission carrying the persistent scheduling and the non-adaptive retransmission, and a compensation factor $\alpha(1)$ in case of the PUSCH transmission carrying the dynamic scheduling and the adaptive retransmission may be obtained.

After the downlink pathloss of the UE is calculated with the equation (1), the second calculating unit 704 determines that the uplink pathloss equals to a sum of the obtained downlink pathloss and the preset correction value in the case that the UE is located in the FDD network, or the second calculating unit 704 determines that the uplink pathloss equals to the downlink pathloss in the case that the UE is located in the TDD network.

In the case that the measurement item related to the uplink coverage includes the power of the PUSCH for each resource block, the second calculating unit 704 may calculate based on the MDT parameter to obtain the power of the PUSCH for each resource block with at least one of the following equations:

$$P_{RB\_PUSCH}=P_{O\_PUSH}(j)+\alpha(j)*PL+\Delta_{TF}(i)+f(i) \quad \text{equation (2)}$$

$$P_{RB\_PUSCH}=P_{O\_PUSH}(j)+\alpha(j)*PL+\Delta_{TF}(i) \quad \text{equation (3)}$$

$$P_{RB\_PUSCH}=P_{O\_PUSH}(j)+\alpha(j)*PL \quad \text{equation (4)}$$

$$P_{RB\_PUSCH}=P_{O\_PUSH}(j)+\alpha(j)*PL+f(i) \quad \text{equation (5)}$$

where $P_{RB\_PUSCH}$ represents the power of the PUSCH for each resource block, $P_{O\_PUSCH}(i)$ represents an initial value of the power of the PUSCH, $\alpha(j)$ represents a compensation factor for the pathloss, j represents a preset transmission approach, $\Delta_{TF}(i)$ represents an adjustment for the power based on the modulation and coding scheme MCS of the ith frame, and f(i) represents a correction value based on a Transmission Power Control TPC command in case of the ith frame.

It should be noted that, according to the embodiment of the disclosure, powers of the PUSCH for each resource block calculated with the equations (2) to (5) have different representations from each other. In the case that $P_{RB\_PUSCH}$ is calculated with the equation (2), both an effect of the MCS and an effect of the TPC are taken into consideration. In the case that $P_{RB\_PUSCH}$ is calculated with the equation (3), the effect of the MCS is taken into consideration while the effect of TPC is not. In the case that $P_{RB\_PUSCH}$ is calculated with the equation (4), neither the effect of the MCS nor the effect of the TPC is taken into consideration. In the case that $P_{RB\_PUSCH}$ is calculated with the equation (5), the effect of the TPC is taken into consideration while the effect of the MCS is not.

It should be noted that, in practice, at least one of the equations (2) to (5) may be chosen as needed to obtain the power of the PUSCH for each resource block under different conditions.

In the case that the measurement item includes the power headroom, the second calculating unit 704 may calculate based on the MDT parameter to obtain the power headroom with the following equation:

$$PH=P_{CMAX}-P_{RB\_PUSCH} \quad \text{equation (6)}$$

or with the following equation:

$$PH=P_{POWERCLASS}-P_{RB\_PUSCH} \quad \text{equation (7)}$$

where PH represents the power headroom, $P_{CMAX}$ represents a maximum available output power of the UE, $P_{RB\_PUSCH}$ represents the power of the PUSCH for each resource block, and $P_{POWERCLASS}$ represents a power class of the UE.

It should be noted that, $P_{RB\_PUSCH}$ in the equation (6) or the equation (7) may be obtained with any one of the equations (2) to (5), which may be chosen based on conditions and is not limited here.

It should be noted that, in the case that the measurement item includes the power headroom but does not include the power of the PUSCH for each resource block, the second calculating unit 704 may calculate the power of the PUSCH for each resource block with any one of the equations (2) to (5), and then calculate the power headroom with the equation (6) or the equation (7).

It should be noted that, according to the embodiment of the disclosure, the power headroom may be obtained with other approaches. For example, the second calculating unit 704 may calculate PH of the UE based on the downlink RSRP.

In the case that the measurement item includes the power of the PUCCH, the second calculating unit 704 may calculate the power of the PUCCH based on the MDT parameter with at least one of the following equations:

$$P_{PUCCH}=P_{O\_PUCCH}+PL+g(i) \quad \text{equation (8)}$$

$$P_{PUCCH}=P_{O\_PUCCH}+PL \quad \text{equation (9)}$$

$$P_{PUCCH}=\min\{P_{CMAX},P_{O\_PUCCH}+PL+h(n_{CQI},n_{HARQ})+\Delta_{F\_PUCCH}(F)+g(i)\} \quad \text{equation (10)}$$

where $P_{PUCCH}$ represents the power of the PUCCH, $P_{O\_PUCCH}$ represents an initial value of the power of the PUCCH, g(i) represents a correction value based on a TPC command in case of an ith frame, $P_{CMAX}$ represents a maximum available output power of the UE, and both $h(n_{CQI},n_{HARQ})$ and $\Delta_{F\_PUCCH}(F)$ represent correction values based on a format of the PUCCH.

It should be noted that, according to the embodiment of the disclosure, powers of the PUCCH calculated with the equations (8) to (10) have different representations from each other. In the case that the power of the PUCCH is calculated with the equation (8), an effect of the TPC is taken into consideration while an effect of the format of the PUCCH is not. In the case that the power of the PUCCH is calculated with the equation (9), neither the effect of the format of the PUCCH nor the effect of the TPC is taken into consideration. In the case that the power of the PUCCH is calculated with the equation (10), both the effect of the TPC and the effect of the format of the PUCCH are taken into consideration. In practice, at least one of the equations (8) to (10) may be chosen to obtain the corresponding $P_{PUCCH}$ which is not limited here.

It should be noted that, according to the embodiment of the disclosure, the measurement item related to the uplink coverage includes at least one of the uplink pathloss, the power of the PUSCH for each resource block and the power of the PUCCH. The measurement item related to the uplink coverage may further include the power headroom but may not include only the power headroom. The UE may choose corresponding approach(es) based on the specific parameter included in the measurement item related to the uplink coverage, to obtain the measurement result of the parameter. For example, in the case that the measurement item related to the uplink coverage includes the uplink pathloss and the power of the PUSCH for each resource block, the second calculating unit 704 calculates the measurement results of the uplink pathloss and the power of the PUSCH for each resource block with the approaches described in 5) and 6).

According to the embodiment of the disclosure, after obtaining the MDT task parameter, the UE collects the MDT parameter based on the MDT task parameter, calculates the measurement result of the measurement item related to the uplink coverage based on the collected MDT parameter, and sends the measurement result to eNB. Accordingly, eNB may save the measurement result in the MDT measurement report to send the MDT measurement report to the TCE. Since the measurement item related to the uplink coverage includes at least one of the power headroom, the uplink pathloss, the power of the PUSCH for each resource block and the power of the PUCCH, the uplink pathloss and an uplink interference of the UE may be precisely determined with a coverage optimization application in a TCE layer, to precisely identify a problem in the uplink coverage of the UE.

It should be understood by those skilled in the art that, all or part of the processes of the methods according to the embodiments of the disclosure may be implemented by corresponding hardware commanded by programs. The programs may be stored in a computer readable storage medium. The storage medium may be a Read Only Memory, a magnetic disk, a Compact Disk, etc.

The methods for obtaining the measurement result of the measurement item related to the uplink coverage and the devices thereof have been detailed. Changes can be made to the embodiments and the application by those skilled in the art based on conceptions of the embodiments of the disclosure. Therefore, the specification is not intended to limit the disclosure.

The invention claimed is:

1. A method for obtaining and reporting a measurement result of a measurement item related to an uplink coverage, comprising:
    obtaining a minimized drive test MDT parameter,
    calculating the measurement result of the measurement item related to the uplink coverage based on the MDT parameter, and sending the measurement result of the measurement item related to the uplink coverage; or
    saving the MDT parameter in an MDT measurement report and sending the MDT measurement report to a trace collection entity TCE, by an evolved Node B eNB, wherein the TCE obtains the MDT parameter from the obtained MDT measurement report and calculates the measurement result of the measurement item related to the uplink coverage based on the MDT parameter,
wherein the measurement item related to the uplink coverage comprises one of:
    1) a power of a Physical Uplink Shared Channel PUSCH for each resource block, the MDT parameter comprises an initial value $P_{O\_PUSCH}(j)$ of the power of the PUSCH, a compensation factor $\alpha(j)$ of a pathloss, a preset transmission approach j, an adjustment $\Delta_{TF}(i)$ for a power based on a Modulation and Coding Scheme MCS of an ith frame, and a correction value f(i) based on a Transmission Power Control TPC command in case of the ith frame; and
        calculating the measurement result of the measurement item related to the uplink coverage based on the MDT parameter comprises:
            calculating the power of the PUSCH for each resource block with at least one of the following equations:

$P_{RB\_PUSCH} = P_{O\_PUSH}(j) + \alpha(j)*PL + \Delta_{TF}(i) + f(i);$ $P_{RB\_PUSCH} = P_{O\_PUSH}(j) + \alpha(j)*PL + \Delta_{TF}(i);$ $P_{RB\_PUSCH} = P_{O\_PUSH}(j) + \alpha(j)*PL;$ $P_{RB\_PUSCH} = P_{O\_PUSH}(j) + \alpha(j)*PL + f(i);$ wherein $P_{RB\_PUSCH}$ represents the power of the PUSCH for each resource block; or
    2) a power of a Physical Uplink Control Channel PUCCH, the MDT parameter comprises an initial value $P_{O\_PUCCH}$ of the power of the PUCCH, a correction value g(i) based on a TPC command in case of an ith frame, a maximum available output power $P_{cMax}$ of the UE, and correction values $h(n_{CQI}, n_{HARQ})$ and $\Delta_{F\_PUCCH}(F)$ based on a format of the PUCCH; and
        calculating the measurement result of the measurement item related to the uplink coverage based on the MDT parameter comprises:
            calculating the power of the PUCCH with at least one of the following equations:

$P_{PUCCH} = P_{O\_PUCCH} = PL + g(i);$ $P_{PUCCH} = P_{O\_PUCCH} + PL;$ $P_{PUCCH} = \min\{P_{CMAX}, P_{O\_PUCCH} + PL + h(n_{CQI}, n_{HARQ}) + \Delta_{F\_PUCCH}(F) + g(i)\};$ wherein $P_{PUCCH}$ represents the power of the PUCCH; or
    3) a power headroom, the MDT parameter comprises a maximum available output power $P_{CMAX}$ of the UE, a power class $P_{POWERCLASS}$ of the UE, an initial value $P_{O\_PUSCH}(j)$ of the power of the PUSCH, a compensation factor $\alpha(j)$ of a pathloss, a preset transmission approach j, an adjustment $\Delta_{TF}(i)$ for a power based on a Modulation and Coding Scheme MCS of an ith frame, and a correction value f(i) based on a Transmission Power Control TPC command in case of the ith frame; and calculating the measurement result of the measurement item related to the uplink coverage based on the MDT parameter comprises:
calculating the power headroom with at least one of the following equations:

$PH=P_{CMAX}-(P_{O\_PUSH}(j)+\alpha(j)*PL+\Delta_{TF}(i)+f(i));$ $PH=P_{CMAX}-(P_{O\_PUSH}(j)+\alpha(j)*PL+\Delta_{TF}(i));$ $PH=P_{CMAX}-(P_{OPUSH}(j)+\alpha(j)*PL);$ $PH=P_{CMAX}-(P_{O\_PUSH}(j)+\alpha(j)*PL+f(i));$ $PH=P_{POWERCLASS}-(P_{O\_PUSH}(j)+\alpha(j)*PL+\Delta_{TF}(i)+f(i));$ $PH=P_{POWERCLASS}-(P_{O\_PUSH}(j)+\alpha(j)*PL+\Delta_{TF}(i));$ $PH=P_{POWERCLASS}-(P_{O\_PUSH}(j)+\alpha(j)*PL);$ $PH=P_{POWERCLASS}-(P_{O\_PUSH}(j)+\alpha(j)*PL+f(i));$ wherein PH represents the power headroom.

2. The method according to claim 1, wherein obtaining the minimized drive test MDT parameter comprises:
obtaining an MDT task parameter and collecting the MDT parameter based on the MDT task parameter, by a user equipment UE;
wherein the calculating the measurement result of the measurement item related to the uplink coverage based on the MDT parameter, and sending the measurement result of the measurement item related to the uplink coverage comprises:
calculating, by the UE, the measurement result of the measurement item related to the uplink coverage based on the MDT parameter; and
carrying, by the UE, the measurement result of the measurement item related to the uplink coverage in a Media Access Control MAC protocol message or a Radio Resource Control RRC protocol message to be sent to the eNB.

3. The method according to claim 1, wherein obtaining the minimized drive test MDT parameter comprises:
receiving an MDT task parameter configured by an element manager EM and collecting the MDT parameter based on the MDT task parameter, by the eNB;
wherein calculating the measurement result of the measurement item related to the uplink coverage based on the MDT parameter, and sending the measurement result of the measurement item related to the uplink coverage comprises:
calculating, by the eNB, the measurement result of the measurement item related to the uplink coverage based on the MDT parameter;
saving, by the eNB, the measurement result of the measurement item related to the uplink coverage in an MDT measurement report; and
sending, by the eNB, the MDT measurement report to the TCE.

4. The method according to claim 1, wherein in the case that the measurement item related to the uplink coverage comprises the uplink pathloss, the MDT parameter comprises a maximum available output power $P_{CMAX}$ of the UE, the power headroom PH, a number $M_{PUSCH}(i)$ of resource block(s) validated in an ith frame and allocated for the PUSCH, an initial value $P_{O\_PUSCH}(j)$ of the power of the PUSCH, a compensation factor $\alpha(j)$ of a pathloss, a preset transmission approach j, an adjustment $\Delta_{TF}(i)$ for a power based on a Modulation and Coding Scheme MCS of an ith frame, and a correction value f(i) based on a Transmission Power Control TPC command in case of the ith frame;
wherein calculating the measurement result of the measurement item related to the uplink coverage based on the MDT parameter comprises:
calculating a downlink pathloss with the following equation:

$PL=\{P_{CMAX}-PH-10lg(M_{PUSCH}(i))-P_{O\_PUSCH}(j)-\Delta_{TF}(i)\}/\alpha(j)$ wherein PL represents the downlink pathloss of the UE;
determining that the uplink pathloss of the UE equals to a sum of the downlink pathloss of the UE and a preset correction value in the case that the UE is located in a Frequency Division Duplexing FDD network, or determining that the uplink pathloss of the UE equals to the downlink pathloss of the UE in the case that the UE is located in a Time Division Duplexing TDD network.

5. The method according to claim 3, wherein the saving, by the eNB, the measurement result of the measurement item related to the uplink coverage in an MDT measurement report comprises:
saving, by the eNB, a correspondence among the measurement result of the measurement item related to the uplink coverage, a serial number of a resource block of the UE, and location information of the UE, in the MDT measurement report.

6. The method according to claim 1, wherein the measurement item related to the uplink coverage is comprised in an MDT task parameter configured by an element manager EM.

7. The method according to claim 1, wherein in the case that the measurement item related to the uplink coverage comprises a first measurement item and a second measurement item, the first measurement item comprises a power headroom, the power headroom is comprised in an MDT task parameter configured by an element manager EM, the second measurement item comprises at least one of the uplink pathloss, the power of the PUSCH for each resource block and the power of the PUCCH, and the second measurement item is pre-configured by the eNB.

8. A device comprising:
a processor, configured to obtain an MDT parameter; calculate the measurement result of the measurement item related to the uplink coverage based on the MDT parameter; or save the MDT parameter in an MDT measurement report and send the MDT measurement report to a trace collection entity TCE, wherein the TCE obtains the MDT parameter from the received MDT measurement report and calculates the measurement result of the measurement item related to the uplink coverage based on the MDT parameter; wherein the measurement item related to the uplink coverage comprises at least one of an uplink pathloss, a power of a PUSCH for each resource block and a power of a PUCCH; and
a sender, configured to send the measurement result of the measurement item related to the uplink coverage after the measurement result of the measurement item related to the uplink coverage is calculated by the processor; or send the MDT measurement report after the MDT parameter is obtained and saved into the MDT measurement report by the processor,
wherein the MDT parameter comprises at least one of an RSRP of the UE, a maximum available output power $P_{CMAX}$ of the UE, a number $M_{PUSCH}(i)$ of resource block(s) validated in an ith frame and allocated for the PUSCH, an initial value of the power $P_{O\_PUSCH}(j)$ of the PUSCH, a compensation factor $\alpha(j)$ for a pathloss, a preset transmission approach j, an adjustment $\Delta_{TF}(i)$ for a power based on a Modulation and Coding Scheme MCS of an ith frame, a correction value f(i) based on a TPC command in case of the ith frame, an initial value $P_{O\_PUCCH}$ of the power of the PUCCH, a power class $P_{POWERCLASS}$ of the UE, and correction values $h(n_{CQI}, n_{HARQ})$ and $\Delta_{F\_PUCCH}(F)$ based on a format of the PUCCH;

wherein in the case that the measurement item related to the uplink coverage comprises the power of the PUSCH for each resource block, the power of the PUSCH for each resource block is calculated with at least one of the(following equations:

$$P_{RB\_PUSCH}=P_{O\_PUSH}(j)+\alpha(j)*PL+\Delta_{TF}(i)+f(i);$$

$$P_{RB\_PUSCH}=P_{O\_PUSH}(j)+\alpha(j)*PL+\Delta_{TF}(i);$$

$$P_{RB\_PUSCH}=P_{O\_PUSH}(j)+\alpha(j)*PL;$$

$$P_{RB\_PUSCH}=P_{O\_PUSH}(j)+\alpha(j)*PL+f(i);$$

wherein $P_{RB\_PUSCH}$ represents the power of the PUSCH for each resource block;

wherein in the case that the measurement item comprises the power headroom, the power headroom is calculated with the following equation:

$$PH=P_{CMAX}-P_{RB\_PUSCH}$$

or with the following equation:

$$PH=P_{POWERCLASS}-P_{RB\_PUSCH}$$

wherein PH represents the power headroom;

wherein in the case that the measurement item comprises the power of the PUCCH, the power of the PUCCH is calculated with at least one of the following equations:

$$P_{PUCCH}=P_{O\_PUCCH}+PL+g(i)$$

$$P_{PUCCH}=P_{O\_PUCCH}+PL;$$

$$P_{PUCCH}=\min\{P_{CMAX}, P_{O\_PUCCH}+PL+h(n_{CQI}, n_{HARQ})+\Delta_{F\_PUCCH}(F)+g(i)\};$$

wherein $P_{PUCCH}$ represents the power of the PUCCH;

wherein in the case that the measurement item related to the uplink coverage comprises the uplink pathloss, a downlink pathloss of the UE is calculated based on the RSRP of the UE, or the downlink pathloss of the UE is calculated with the following equation:

$$PL=\{P_{CMAX}-PH-10\lg(M_{PUSCH}(i))-P_{O\_PUSCH}(j)-\Delta_{TF}(i)-f(i)\}/\alpha(j);$$

wherein PL represents the downlink pathloss of the UE, the uplink pathloss of the UE is determined as being equal to a sum of the downlink pathloss of the UE and a preset correction value in the case that the UE is located in a Frequency Division Duplexing FDD network, or the uplink pathloss of the UE is determined as being equal to the downlink pathloss of the UE in the case that the UE is located in a Time Division Duplexing TDD network.

9. The device according to claim 8, wherein the device is a base station eNB;

wherein the processor is further configured to:
  receive an MDT task parameter configured by an element manager EM and collect the MDT parameter based on the MDT task parameter;
  calculate the measurement result of the measurement item related to the uplink coverage based on the MDT parameter, after the MDT parameter is collected; and
  save the measurement result of the measurement item related to the uplink coverage in the MDT measurement report, after the measurement result of the measurement item related to the uplink coverage is calculated.

10. The device according to claim 8, wherein the device is a base station eNB;

wherein the processor is further configured to:
  receive an MDT task parameter configured by an element manager EM and collect the MDT parameter based on the MDT task parameter; and
  save the MDT parameter in the MDT measurement report after the MDT parameter is collected.

11. The device according to claim 8, wherein the device is a user equipment UE;

wherein the processor is further configured to:
  obtain an MDT task parameter and collect the MDT parameter based on the MDT task parameter; and
  calculate the measurement result of the measurement item related to the uplink coverage based on the MDT parameter, after the MDT parameter is obtained.

\* \* \* \* \*